April 5, 1927.
E. R. BURTNETT
INLET MANIFOLD FOR INTERNAL COMBUSTION ENGINES
Filed Oct. 8, 1924
1,623,388
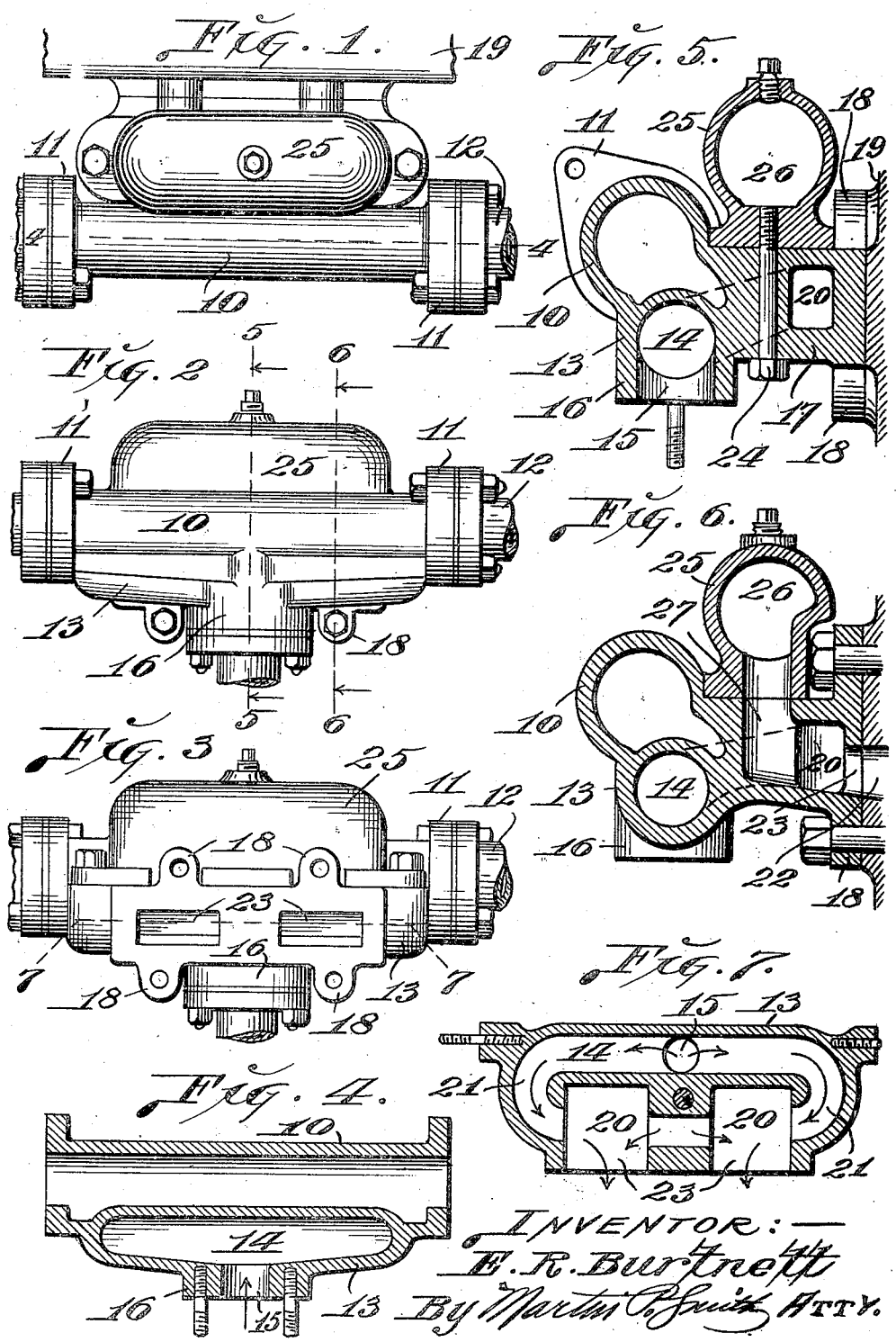
INVENTOR:—
E. R. Burtnett
By Martin P. Smith, ATTY.

Patented Apr. 5, 1927.

1,623,388

UNITED STATES PATENT OFFICE.

EVERETT R. BURTNETT, OF LOS ANGELES, CALIFORNIA, ASSIGNOR, BY DIRECT AND MESNE ASSIGNMENTS, TO THE AUTOMOTIVE VALVES CO., OF LOS ANGELES, CALIFORNIA, A VOLUNTARY TRUST.

INLET MANIFOLD FOR INTERNAL-COMBUSTION ENGINES.

Application filed October 8, 1924. Serial No. 742,406.

My invention relates generally to internal combustion engines, and more particularly to the gaseous fuel inlet manifolds therefor, the principal object of my invention being to provide a gaseous fuel inlet manifold for two stroke cycle internal combustion engines of the type in which no inlet valves are used for controlling the admission of gaseous fuel to the precompression chamber and in which the gaseous fuel charge is admitted to the precompression chamber during the relatively short period of time that the piston of said precompression chamber is passing outer dead center, and said fuel charge being admitted through ports uncovered by the piston at such time.

The inlet manifold herein illustrated and described is an improvement on the manifold disclosed in my co-pending patent application filed July 31, 1924, Serial No. 729,299.

The principal objects of my invention are to generally improve upon and simplify the construction of the particular form of manifold disclosed in my aforesaid patent application; to provide a manifold having a single gaseous fuel admission port or opening and two outlet openings that may be directly connected to the cylinder chambers of the engine with which the manifold is associated; and, further, to combine with the inlet manifold, a substantially tubular section or member having a passageway that is traversed by the heated gases and products of combustion that leave the combustion chambers of the engine and which arrangement is effective in preheating the gaseous fuel that enters and passes through the inlet manifold.

With the foregoing and other objects in view, my invention consists in the features of construction and combination and arrangement of parts hereinafter more fully described and claimed, reference being had to the accompanying drawings, in which—

Figure 1 is a top plan view of an inlet manifold of my improved construction;

Figure 2 is a front elevational view of the manifold;

Figure 3 is an elevational view of the rear or inner side of my improved manifold;

Figure 4 is a vertical section taken on the line 4—4 of Figure 1;

Figure 5 is an enlarged cross section taken on the line 5—5 of Figure 2;

Figure 6 is an enlarged cross section taken on the line 6—6 of Figure 2;

Figure 7 is a horizontal section taken on the line 7—7 of Figure 3.

Referring by numerals to the accompanying drawings, which illustrate a practical embodiment of my invention, 10 designates a horizontally disposed tubular member that is adapted to function as a part of the exhaust pipe or duct and the ends of said tubular member are provided with suitable ears or flanges 11 that are perforated in order to receive bolts or the like that connect said member to adjacent ends of the exhaust conduit 12. Formed integral with the under side of member 10 is a longitudinally disposed housing 13 that encloses a chamber 14, and formed in the lower portion of the center of housing 13 is a gaseous fuel inlet opening 15 that communicates directly with said chamber 14. Inlet opening 15 is preferably surrounded by an integrally formed collar or flange 16 that may be directly connected in any suitable manner to a source of gaseous fuel supply, such as a carbureter. The entire upper portion of housing 13 forms the partition wall between chamber 14 and the passageway through the exhaust conduit member 10. Consequently, this partition will be highly heated by the exhaust gases passing through member 10, and a substantial portion of heat transmitted to said partition will be absorbed by the gaseous fuel that enters and passes through chamber 14.

Formed integral with the inner sides of members 10 and 13 and projecting outwardly therefrom is a longitudinally disposed block 17 that is provided on its outer portion with upwardly and downwardly projecting ears or lugs 18 that are perforated in order to receive bolts or like fastening means whereby the entire manifold structure is firmly secured to the engine cylinder block 19. Formed in the outer portion of this block is a longitudinally disposed chamber 20, the same occupying a horizontal plane slightly above the plane occupied by chamber 14, and the ends of the chambers 14 and 20 are connected by curved ducts 21, the same occupying planes that are slightly inclined relative to a horizontal plane so that their bottom surfaces decline from the ends of chamber 20 to the ends of chamber 14.

Formed through the outer portion of block 17 and leading from the end portions of chamber 20 therein to inlet openings 22 that lead to the cylinder chambers within the cylinder block are short gaseous fuel inlet ducts 23. Detachably mounted on top of block 17 and secured thereto by a bolt 24 that passes upwardly through said block is a longitudinally disposed housing 25, the diameter of which is substantially larger than housing 13, and the ends of the relatively large chamber 26 within said housing 25 are connected to the end portions of chamber 20 by short vertically disposed ducts 27.

The volumetric capacity of chamber 26 is substantially greater than that of chamber 20, and as a result the sudden demand developed by the suction stroke of a piston within the engine with which the manifold is associated on the gaseous fuel volume drawn from the carbureter or other source of supply will not cause an extraordinary or abnormal fluctuation of velocity and pressure on said carbureter. Consequently, the latter may be adjusted to provide proper velocity and the desirable and advantageous steady column movement, which latter materially assists in effecting a uniform metering of the fuel with the air.

It will be understood that gaseous fuel from the carbureter or other source of supply enters chamber 14 through port 15 and while passing through said chamber 14 said gaseous fuel is preheated by the transfer of heat from the products of combustion passing through exhaust conduit section 10. From chamber 14 the gaseous fuel passes through curved ducts 21 to chamber 20, the ends of which latter are connected by ducts 27 with chamber 26. In effect, an endless gaseous fuel supply chamber is provided by the connected chambers 20 and 26, and while the engine is in operation there will always be a certain amount of gaseous fuel within this endless chamber. On each suction stroke within the engine gaseous fuel will be drawn through one of the outlet openings 23 in both directions from the endless gaseous fuel supply chamber, consequently there will be very little, if any, fluctuation of pressure within the manifold for, said endless chamber is constantly supplied with gaseous fuel from preheating chamber 14 that is connected to the carbureter, and as a result said carbureter will function to develop maximum power and fuel economy during engine operation.

The bottom surfaces of the outlet ducts 23 gradually decline toward the openings 22 into the combustion chambers of the engine. Hence, any condensation that may occur within the endless gaseous fuel chamber will, by gravity, flow downward over said inclined surfaces and will finally pass through the openings 22 into the cylinder chambers of the engine.

An inlet manifold of my improved construction is comparatively simple, may be easily and cheaply produced, provides means for preheating the gaseous fuel employed before the latter enters the cylinder chambers of the engine, and is very effective in performing its intended functions.

It will be readily understood that various minor changes in the size, form and construction of my improved gaseous fuel inlet manifold may be made without departing from the spirit of my invention, the scope of which is set forth in the appended claims.

I claim as my invention:

1. A gaseous fuel inlet manifold having three horizontally disposed chambers, the ends of two of said chambers being connected to the ends of the third chamber thereby forming in effect a pair of endless chambers and the third chamber to which the ends of the pair of chambers are connected being provided with a pair of separate outlets.

2. A gaseous fuel inlet manifold having three horizontally disposed chambers, the ends of two of said chambers being connected to the ends of the third chamber thereby forming in effect a pair of endless chambers, the third chamber to which the ends of the pair of chambers are connected being provided with a pair of separate outlets and a tubular member formed integral with said manifold and lying parallel with the three chambers therein, which tubular member is adapted to function as an exhaust gas conduit member.

3. A gaseous fuel inlet manifold having three horizontally disposed parallel chambers that occupy three different horizontal planes, the ends of the upper one of the three chambers and the lower one of said three chambers being connected to the ends of the intermediate chamber, there being a gaseous inlet opening into the central portion of the lower one of the three chambers and there being a pair of gaseous fuel outlet openings leading from the end portions of the intermediate chamber.

4. A gaseous fuel inlet manifold having three horizontally disposed parallel chambers that occupy three different horizontal planes, the ends of the upper one of the three chambers and the lower one of said three chambers being connected to the ends of the intermediate chamber, there being a gaseous inlet opening into the central portion of the lower one of the three chambers, there being a pair of gaseous fuel outlet openings leading from the end portions of the intermediate chamber and a tubular member formed integral with said inlet manifold and adapted to function as an exhaust gas conduit member.

In testimony whereof I affix my signature.

EVERETT R. BURTNETT.